Dec. 27, 1938.                    F. J. CORDOVA                    2,141,173
                              GEOLOGICAL INSTRUMENT
                               Filed Feb. 1, 1938
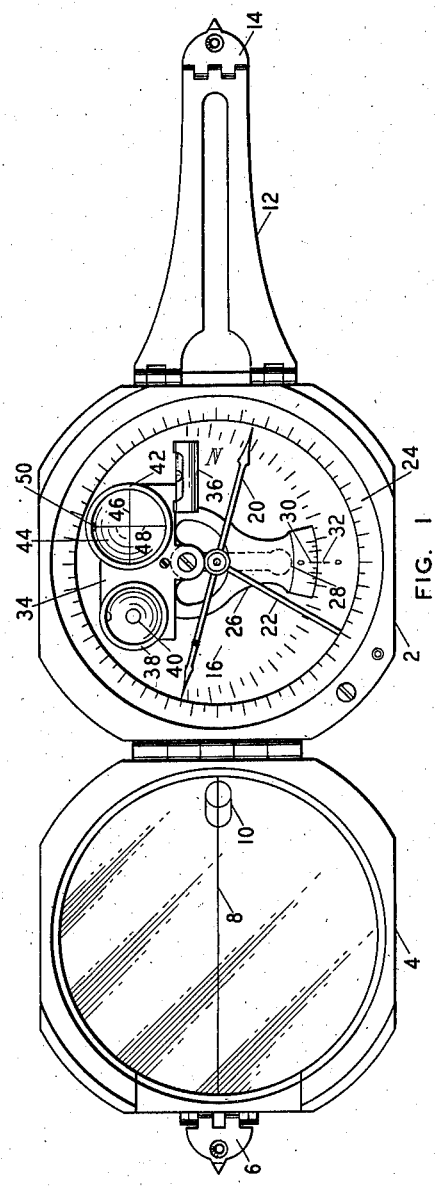
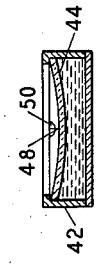
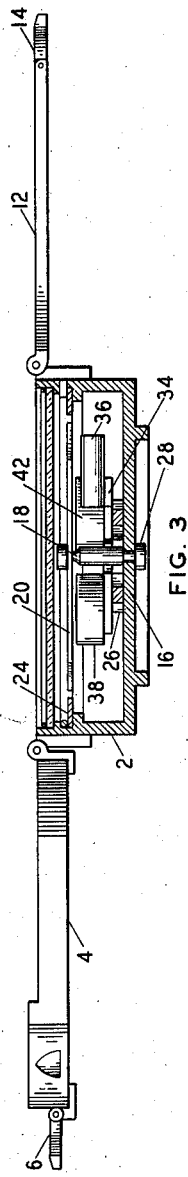
Francisco J. Cordova
INVENTOR
BY Arthur L. Davis
ATTORNEY Patented Dec. 27, 1938

2,141,173

UNITED STATES PATENT OFFICE 2,141,173

GEOLOGICAL INSTRUMENT

Francisco J. Cordova, near Sheffield, Ala.

Application February 1, 1938, Serial No. 188,134

5 Claims. (Cl. 33—69)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of surveying, and particularly to the measurement of the position of geological strata.

One of the objects of this invention is to provide an apparatus for the accurate measurement of the angle of dip, the direction of dip and the direction of strike of strata. Another object of this invention is to provide an apparatus for the measurement of dip and strike on which a clinometric scale may be inscribed and the clinometric arm may move freely across said scale. Still another object of this invention is to provide an apparatus for the measurement of dip and strike which is readily portable and easily accessible for use, even when traversing an irregular terrain. Other objects of this invention include the provision of an apparatus for indicating levels, with the apparatus either used separately or in combination with other instruments for physical measurement.

I have discovered a geological instrument for the measurement of the angle of dip and the direction of strike which comprises the combination of a pocket transit with a longitudinal bubble level, and a circular bubble level with a convex cover which registers in a plane at right angles to the plane of register of the longitudinal bubble; and a circular bubble level with a concave cover, which is in the same plane as the bubble level with the convex cover, and two indicia across the concave cover in planes at right angles to each other with the plane of one of the indicia parallel to the plane of register of the longitudinal level. The circular bubble level with a concave cover may be used as a leveling means or as a means for the indication of angular rotation when used alone or in combination with other apparatus elements.

In the accompanying drawing, which forms a part of the specification and wherein reference symbols refer to like parts wherever they occur, Fig. 1 is a view of a pocket transit, with the cover and sight arm, respectively, opened, resting in a vertical position and registering a horizontal plane;

Fig. 2 is a sectional view of a circular bubble level, in the pocket transit shown in Fig. 1, for use in the measurement of dip and strike;

Fig. 3 is a view of the pocket transit shown in Fig. 1, resting in a horizontal position and registering a horizontal plane.

In Fig. 1 and Fig. 3, the case 2, is provided with a cover 4, to which is attached a folding sight 6. The sight line 8, extends across the mirror and the sight opening 10, extends through the cover to provide a means for making readings or measurements as will be subsequently described. The case 2, is also provided with a folding sight arm 12, carrying a folding sight 14, and hinged to the portion of the case 2, opposite the cover 4, so that it may be used in conjunction with the folding sight 6, and the sight opening 10. Rigidly supported by the bottom wall 16, of the case 2, is a pintle 18, upon which is mounted a magnetic needle 20, a suitably graduated compass ring 24 is carried by the side walls of the case 2, and is adapted to indicate the relative position of the transit with respect to the magnetic poles in the usual manner. Pivotally secured to the bottom wall 16, of the case 2, is the clinometric arm 26, which is operated by the thumb lever 28, located upon the back of the bottom wall of the case. The clinometric arm 26, carries a vernier scale 30, which moves across a graduated scale 32 carried by the bottom wall 16. A bracket 34, is secured to the clinometric arm 26, and supports a longitudinal bubble level 36, the plane of curvature of which is accurately located so as to be parallel to the plane of movement of the clinometric arm 26.

In Fig. 1, Fig. 2 and Fig. 3, the bracket 34, is secured to the clinometric arm 26, and, in addition to supporting the longitudinal bubble level 36, also supports a circular bubble level 38, upon the transparent convex cover of which is inscribed a centralized circular indicia, and a circular bubble level 42, with a transparent concave cover 44, upon which is etched a dip indicia 46, and a strike indicia 48, with these two indicia lying in planes perpendicular to each other. The circular bubble lever 42, contains a bubble 50, of the minimum size consistent with accurate operation through a substantial temperature range.

One example of the operation of the instrument is given for turning a 90° angle in a horizontal plane in order to show the operation of the circular bubble level with the concave cover. The transit is placed in a true horizontal plane as indicated by the perfect register of the bubble of the circular bubble level with a convex surface with the centralized circular indicia and the folding sights moved into a vertical position. A backsight is taken and the transit is tilted slightly until the bubble of the circular bubble level with a concave cover coincides with one of the indicia on the cover, still retaining the original alignment. The transit is again tilted slightly and turned through an angle of 90° as indicated by the movement of the bubble in the circular bubble level with the concave cover from its aligned position with one indicia to corresponding alignment with an adjacent indicia positioned 90° from the first indicia and the transit again placed in a true horizontal plane. The foresight is then taken.

Another example for the operation of this instrument is given for measuring the angle of dip, the direction of dip and the direction of strike of a geological stratum. The transit is placed on its side and parallel to the dip of the stratum. The longitudinal bubble level is centered by means of the thumb lever located in the back of the case. The vertical angle, that is, the angle of dip of the stratum, is recorded by means of the graduated arc provided on the bottom of the case and the vernier provided on the clinometric arm. In such position the bubble of the circular bubble level with a concave cover will be in alignment with the vertical indicia on the concave cover. The transit is then rotated into a horizontal position with strict alignment of the dip maintained. The bubble of the circular bubble level with a concave cover will still be in alignment with the indicia on the cover. The magnetic needle is released momentarily and the bearing of the dip, that is, the direction of the dip, is recorded. The transit is tilted slightly and rotated until the bubble of the circular bubble level with a concave cover moves into alignment with the adjacent indicia on the concave cover which is positioned at exactly 90° from the first mentioned indicia. The transit is then adjusted to a true horizontal plane as indicated by the bubble of the circular bubble level with the convex surface, the magnetic needle released and the bearing of the strike, that is, the direction of the strike, is recorded.

It will be seen therefore that there are numerous factors which will influence conditions for the most satisfactory operation of my invention, the actual limits of which cannot be established except by a detailed study of each of the possible combinations of apparatus elements and the respective uses to which such combinations may be employed.

The circular bubble level with a transparent concave cover is preferably assembled so that the bubble is of the minimum size consistent with accurate operation through a substantial range of temperature, that is, the smaller the bubble, the more accurate the alignment required with the respective indicia. As an alternative, graduations on either side and adjacent to each indicia may be provided for more perfect alignment. At least one indicia on the concave cover of the level is required with this indicia in a plane perpendicular to the base of the apparatus in which this element is combined. A plurality of indicia may also be provided on the concave cover with one particular example being that of having a second indicia in a plane perpendicular to the plane of the first indicia such as is required when an instrument in which this element is combined is used for the measurement of both the angle of dip and the direction of strike of a stratum. The respective indicia may be colored for simplicity of operation and elimination of the possibility of error where a plurality of indicia are used.

The circular bubble level may be used in combination with well known apparatus in which is included a longitudinal bubble level and a circular bubble level with a convex cover. The use of the circular bubble level with the concave cover affords an effective means for directly obtaining measurements which are not otherwise so obtainable.

When utmost precision is not required, the circular bubble level with a concave cover may be so used in combination with the other elements of a surveying instrument that the incorporation of a longitudinal bubble level is not required. In other words, it may then serve a dual purpose, that is, as a direct reading level and also an element for indicating the rotation of the instrument through a predetermined angle.

The circular bubble level with a concave cover may be used directly in combination with a base which is perpendicular to the plane of one of the indicia or it may be incorporated in a movable element which may be so adjusted that the plane of one indicia is perpendicular to the horizontal or vertical as circumstances may require.

Certain terms used throughout the description and claims are understood to have the following meaning: "dip" refers to the inclination of a bed of rocks to the horizon and the amount of the dip is the angle made with a horizontal plane; and "strike" refers to the line of intersection of a bed of rocks with the horizontal plane and always runs at right angles to the dip.

It will be seen, therefore, that this invention actually may be carried out by the use of various modifications and changes without departing from its spirit or scope, with only such limitations placed thereon as are imposed by the prior art.

I claim:

1. A geological instrument for the measurement of the angle of dip and the direction of strike which comprises, the combination of a pocket transit with a longitudinal bubble level, and a circular bubble level with a convex cover which registers in a plane at right angles to the plane of register of the longitudinal bubble; and a circular bubble level with a concave cover, which is in the same plane as the bubble level with the convex cover, and two indicia across the concave cover in planes at right angles to each other with the plane of one of the indicia parallel to the plane of register of the longitudinal level.

2. A geological instrument for the measurement of the position of deposits which comprises, the combination of a transit with a leveling means for the instrument and a circular bubble level with a concave cover, which is in the same plane as the leveling means, and two indicia across the concave cover in planes at right angles to each other and with the planes of both indicia at right angles to the plane of register of the first mentioned leveling means.

3. In combination with a transit a circular bubble level or indicator with a concave cover, and two indicia across the concave cover in planes at right angles to each other.

4. In an apparatus for indicating the angle of dip and the direction of strike of a formation, the combination of a circular bubble level with a concave cover, and two indicia on the concave cover in planes at right angles to each other.

5. In a leveling apparatus, the combination of a circular bubble level with a concave cover, a liquid beneath the concave cover supporting a fluid bubble, and at least one indicia on the concave cover in a plane perpendicular to the base of the leveling apparatus.

FRANCISCO J. CORDOVA.